US010126603B2

(12) United States Patent
Kim et al.

(10) Patent No.: US 10,126,603 B2
(45) Date of Patent: Nov. 13, 2018

(54) DISPLAY DEVICE AND METHOD FOR MANUFACTURING THE SAME

(71) Applicant: Samsung Display Co., Ltd., Yongin-si, Gyeonggi-do (KR)

(72) Inventors: Tae Gyun Kim, Seoul (KR); Jin Lak Kim, Suwon-si (KR); Se Hee Han, Seoul (KR)

(73) Assignee: SAMSUNG DISPLAY CO., LTD., Gyeonggi-Do (KR)

( * ) Notice: Subject to any disclaimer, the term of this patent is extended or adjusted under 35 U.S.C. 154(b) by 102 days.

(21) Appl. No.: 15/075,337

(22) Filed: Mar. 21, 2016

(65) Prior Publication Data

US 2017/0059904 A1  Mar. 2, 2017

(30) Foreign Application Priority Data

Aug. 25, 2015 (KR) .................. 10-2015-0119596

(51) Int. Cl.
*G02F 1/1339* (2006.01)
*G02F 1/1337* (2006.01)
*G02F 1/1333* (2006.01)

(52) U.S. Cl.
CPC ........ *G02F 1/1339* (2013.01); *G02F 1/13394* (2013.01); *G02F 1/133711* (2013.01); *G02F 2001/13398* (2013.01); *G02F 2001/133388* (2013.01)

(58) Field of Classification Search
CPC .. G02F 1/1339; G02F 1/1337; G02F 1/13394; G02F 1/133711; G02F 2001/13398; G02F 2001/133388
See application file for complete search history.

(56) References Cited

U.S. PATENT DOCUMENTS

| 8,983,220 B2 | 3/2015 | Lee et al. |
| 8,984,419 B2 | 3/2015 | Bandaru et al. |
| 2015/0062515 A1* | 3/2015 | Tomioka ........... G02F 1/133788 349/123 |
| 2015/0226990 A1* | 8/2015 | Miyazaki .............. G02F 1/1339 349/123 |

FOREIGN PATENT DOCUMENTS

| KR | 10-0628863 B1 | 9/2006 |
| KR | 10-1096687 B1 | 12/2011 |
| KR | 10-1228782 B1 | 1/2013 |

* cited by examiner

*Primary Examiner* — Charles Chang
(74) *Attorney, Agent, or Firm* — Cantor Colburn LLP

(57) ABSTRACT

A display device includes: a first substrate including a display area and a non-display area which is arranged outside the display area; a first dam which is disposed in the non-display area of the first substrate and which includes a first stopper having a recessed groove at a surface thereof; and a first alignment layer which covers the display area of the first substrate, the first alignment layer defining a first portion thereof which extends to the non-display area and terminates at the surface of the first stopper.

16 Claims, 10 Drawing Sheets

DISPLAY DEVICE AND METHOD FOR MANUFACTURING THE SAME

This application claims priority to Korean Patent Application No. 10-2015-0119596, filed on Aug. 25, 2015, and all the benefits accruing therefrom under 35 U.S.C. § 119, the content of which in its entirety is herein incorporated by reference.

BACKGROUND

1. Field

The invention relates to a display device and a method for manufacturing the same.

2. Description of the Related Art

Liquid crystal display devices are one of the most widely used display devices. Liquid crystal display devices are configured in that a voltage is applied to electrodes (pixel electrodes and common electrode) disposed on two display substrates facing each other so as to control the alignment of liquid crystal molecules of a liquid crystal layer interposed between the two display substrates, thereby adjusting a quantity of light transmitted through the liquid crystal layer.

The two display substrates of a liquid crystal display device are coupled to each other in general by a sealing member to dispose a liquid crystal layer between the two display substrates. An alignment layer is disposed on a surface of each of the two display substrates facing the liquid crystal layer so as to determine an initial alignment direction of liquid crystal molecules within the liquid crystal layer.

SUMMARY

One or more exemplary embodiment of the invention provides a display device in which a slim bezel is realized while simplifying processes for manufacturing the display device.

One or more exemplary embodiment of the invention provides a liquid crystal display device in which a slim bezel is realized while simplifying processes for manufacturing the liquid crystal display device.

However, exemplary embodiments of the invention are not restricted to the ones set forth herein. Other exemplary embodiments of the invention which are not mentioned herein will become more apparent to one of ordinary skilled in the art to which the invention pertains by referencing the detailed description of the invention given below.

In accordance with an exemplary embodiment, a display device includes: a first substrate including a display area and a non-display area which is arranged outside the display area; a first dam which is disposed in the non-display area of the first substrate and which includes a first stopper having a recessed groove at a surface thereof; and a first alignment layer which covers the display area of the first substrate, the first alignment layer defining a first portion thereof which extends to the non-display area and terminates at the surface of the first stopper.

A material of the first stopper may be different from a material of the first alignment layer.

In a top plan view of the first substrate, the first stopper may extend in an extension direction thereof to enclose the display area of the first substrate and form a closed curve.

In the top plan view of the first substrate, edges of the first stopper may be uneven along an extension direction thereof.

A minimum thickness of the first stopper may be equal to or less than a thickness of the first alignment layer in the display area of the first substrate.

The first portion of the first alignment layer contacts the surface of the first stopper and defines a thickness greater than a thickness of the first alignment layer in the display area of the first substrate.

The display device may further comprise a black column spacer interposed between the first substrate and the first dam, the black column spacer including a light blocking portion disposed overlapped with the first dam, and a spacer portion disposed on the light blocking portion and not overlapped with the first dam.

The first dam may further include a second stopper which is arranged outside the first stopper and spaced apart from the first stopper, the second stopper having a recessed groove at a surface thereof, and the first alignment layer further defines a second portion thereof which extends to the non-display area and terminates at the surface of the second stopper.

The display device may further comprise: a second substrate which includes a display area corresponding to the display area of the first substrate and a non-display area corresponding to the non-display area of the first substrate, the second substrate facing the first substrate with the first alignment layer interposed therebetween; a second dam which is disposed in the non-display area of the second substrate and which includes a third stopper having a recessed groove at a surface thereof; and a second alignment layer which covers the display area of the second substrate, the second alignment layer defining a first portion thereof which extends to the non-display area and terminates at the surface of the third stopper.

A material of the third stopper may be different from a material constituting the second alignment layer.

In a top plan view of the second substrate, the third stopper may extend in an extension direction thereof to enclose the display area of the second substrate and form a closed curve.

In the top plan view of the second substrate, edges of the third stopper may be uneven along the extension direction thereof.

A minimum thickness of the third stopper may be equal to or less than a thickness of the second alignment layer in the display area of the second substrate.

The first portion of the second alignment layer may contact the surface of the third stopper and define a thickness greater than a thickness of the second alignment layer in the display area of the second substrate.

The second dam may further include a fourth stopper which is arranged outside the third stopper and spaced apart from the third stopper, the fourth stopper having a recessed groove at a surface thereof, and the second alignment layer may further define a second portion thereof which extends to the non-display area and terminates at the surface of the fourth stopper.

A distance between a surface of the first stopper adjacent to the first substrate and a highest point of the first alignment layer from the first substrate may be smaller than half a distance between the surface of the first stopper adjacent to the first substrate and a surface of the third stopper adjacent to the second substrate.

In accordance with another exemplary embodiment, a method for manufacturing a display device includes: preparing a first substrate including a display area and a non-display area which is arranged outside the display area; forming a first dam which is disposed in the non-display area of the first substrate and which includes a first stopper having a recessed groove at a surface thereof; and forming a first alignment layer which covers the display area of the first substrate, the first alignment layer defining a first portion thereof which extends to the non-display area and terminates at the surface of the first stopper.

The forming a first dam may include discharging and drying a stopper solution containing stopper solids on the first substrate by a printing process, and the forming a first alignment layer may include discharging and drying an alignment solution containing alignment solids on the first substrate by a printing process.

A material of the stopper solids may be different from a material of the alignment solids.

An amount of the stopper solids may be about 35 weight percent (wt %) or higher with respect to a total weight of the stopper solution, and an amount of the alignment solids may be about 3.5 wt % or higher with respect to a total weight of the alignment solution.

One or more exemplary embodiments of the invention may provide at least one of the following effects.

According to one or more exemplary embodiments of the invention, a slim bezel can be realized for a display device while simplifying processes for manufacturing the display device.

However, effects of the invention are not restricted to the exemplary embodiments set forth herein and more diverse effects are included in this description.

BRIEF DESCRIPTION OF THE DRAWINGS

The above and other advantages and features of this disclosure will become more apparent by describing in further detail exemplary embodiments thereof with reference to the accompanying drawings, in which.

DETAILED DESCRIPTION

Figure 1:
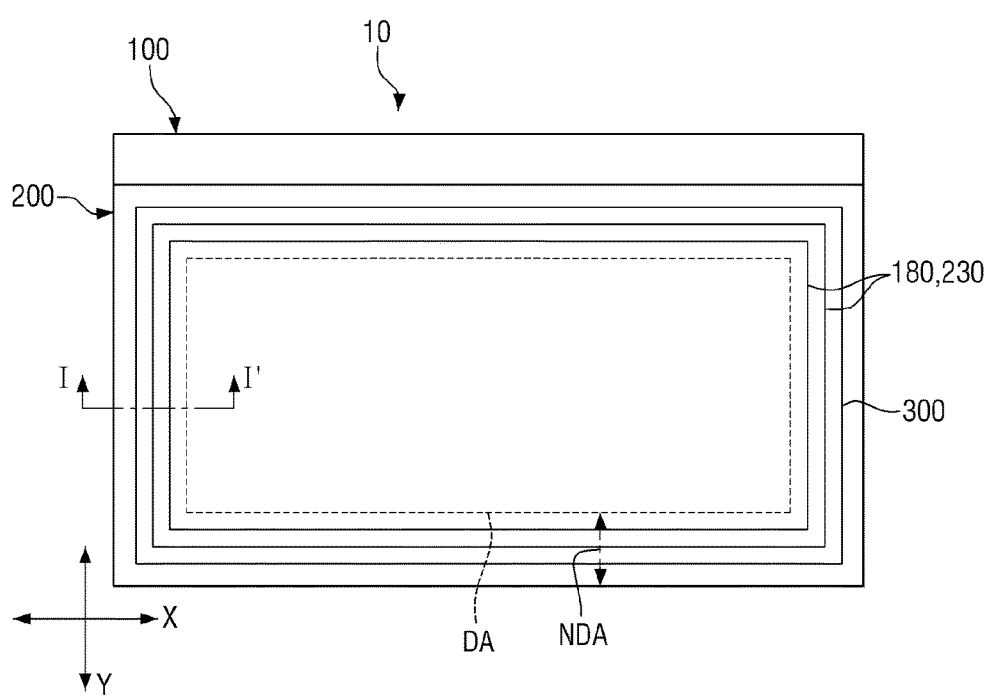
FIG. 1 is a top plan view schematically illustrating a configuration of an exemplary embodiment of a display device according to the invention.

Advantages and features of the invention and methods of accomplishing the same may be understood more readily by reference to the following detailed description of exemplary embodiments and the accompanying drawings. The invention may, however, be embodied in many different forms and should not be construed as being limited to the exemplary embodiments set forth herein. Rather, these exemplary embodiments are provided so that this disclosure will be thorough and complete and will fully convey the invention to those skilled in the art, and the invention will only be defined by the appended claims.

It will also be understood that when a layer is referred to as being "on" another layer or substrate, it can be directly on the other layer or substrate, or intervening layers may also be present. The same reference numbers indicate the same components throughout the specification.

It will be understood that, although the terms first, second, third etc. may be used herein to describe various elements, components, regions, layers and/or sections, these elements, components, regions, layers and/or sections should not be limited by these terms. These terms are only used to distinguish one element, component, region, layer or section from another element, component, region, layer or section. Thus, a first element, component, region, layer or section discussed below could be termed a second element, component, region, layer or section without departing from the teachings of the invention.

The terminology used herein is for the purpose of describing particular embodiments only and is not intended to be limiting. As used herein, the singular forms "a," "an," and "the" are intended to include the plural forms, including "at least one," unless the content clearly indicates otherwise. "Or" means "and/or." As used herein, the term "and/or" includes any and all combinations of one or more of the associated listed items. It will be further understood that the terms "comprises" and/or "comprising," or "includes" and/or "including" when used in this specification, specify the presence of stated features, regions, integers, steps, operations, elements, and/or components, but do not preclude the presence or addition of one or more other features, regions, integers, steps, operations, elements, components, and/or groups thereof.

Furthermore, relative terms, such as "lower" or "bottom" and "upper" or "top," may be used herein to describe one element's relationship to another element as illustrated in the Figures. It will be understood that relative terms are intended to encompass different orientations of the device in addition to the orientation depicted in the Figures. For example, if the device in one of the figures is turned over, elements described as being on the "lower" side of other elements would then be oriented on "upper" sides of the other elements. The exemplary term "lower," can therefore, encompasses both an orientation of "lower" and "upper," depending on the particular orientation of the figure. Similarly, if the device in one of the figures is turned over, elements described as "below" or "beneath" other elements would then be oriented "above" the other elements. The exemplary terms "below" or "beneath" can, therefore, encompass both an orientation of above and below.

"About" or "approximately" as used herein is inclusive of the stated value and means within an acceptable range of deviation for the particular value as determined by one of ordinary skill in the art, considering the measurement in question and the error associated with measurement of the particular quantity (i.e., the limitations of the measurement system). For example, "about" can mean within one or more standard deviations, or within ±30%, 20%, 10% or 5% of the stated value.

Unless otherwise defined, all terms (including technical and scientific terms) used herein have the same meaning as commonly understood by one of ordinary skill in the art to which this disclosure belongs. It will be further understood that terms, such as those defined in commonly used dictionaries, should be interpreted as having a meaning that is consistent with their meaning in the context of the relevant art and the present disclosure, and will not be interpreted in an idealized or overly formal sense unless expressly so defined herein.

Exemplary embodiments are described herein with reference to cross section illustrations that are schematic illustrations of idealized embodiments. As such, variations from the shapes of the illustrations as a result, for example, of manufacturing techniques and/or tolerances, are to be expected. Thus, embodiments described herein should not be construed as limited to the particular shapes of regions as illustrated herein but are to include deviations in shapes that result, for example, from manufacturing. For example, a region illustrated or described as flat may, typically, have rough and/or nonlinear features. Moreover, sharp angles that are illustrated may be rounded. Thus, the regions illustrated in the figures are schematic in nature and their shapes are not intended to illustrate the precise shape of a region and are not intended to limit the scope of the present claims.

An alignment layer within a liquid crystal display device is generally formed by discharging and drying an alignment solution which contains alignment solids on respective surfaces of two display substrates facing each other such as through an inkjet printing process. However, when discharging an alignment solution through an inkjet printing process, the alignment solution diffuses to external sides of the two display substrates, that is, non-display areas thereof, due to the diffusion material properties of the alignment solution. To accommodate the diffused alignment solution in the non-display area of a respective display substrate, a distance between a sealing member disposed in the non-display areas of the two display substrates and a display area of a respective display substrate in which pixel electrodes are disposed may become wider such that an overall width of the non-display area of the liquid crystal display device is undesirably increased. With the increased width of the non-display area of the liquid crystal display device, realizing a relatively slim bezel for covering the non-display area of a display panel within the liquid crystal display may be difficult.

For reducing diffusion of the alignment solution between the display area in which pixel electrodes are disposed and the sealing member, in manufacturing a liquid crystal display device, a conventional technique enables a dam to be formed together with a color filter, a column spacer or a black matrix of a liquid crystal display device during a patterning process for forming the color filter, the column spacer or the black matrix. However, for the liquid crystal display device which has no color filter, no column spacer or no black matrix within either of the two display substrates needs a separate patterning process for forming the dam, which may complicate processes for manufacturing the liquid crystal display device. Therefore, there remains a need for a structure and method for reducing diffusion of the alignment solution between the display area in which pixel electrodes are disposed and the sealing member.

Hereinafter, exemplary embodiments of the invention will be described with reference to the accompanying drawings.

FIG. 1 is a top plan view schematically illustrating a configuration of an exemplary embodiment of a display device according to the invention. FIG. 1 illustrates an arrangement of components relative to each other and sizes thereof should not be construed as limited to those illustrated.

Referring to FIG. 1, an exemplary embodiment of a display device 10 according to the invention may include a first display panel 100, a second display panel 200 facing the first display panel 100, and a sealing member 300 for coupling the first display panel 100 and the second display panel 200 to each other. A liquid crystal layer LCL (shown in FIG. 2) may be interposed between the first display panel 100 and the second display panel 200.

The first display panel 100 may include a display area DA in which an image is displayed and in which a pixel is provided in plural and arranged into a matrix in a first direction X and a second direction Y which intersects the first direction X. The first display panel 100 may further include a non-display area NDA arranged outside the display area DA to enclose the display area DA. The non-display area NDA may exclude the display area DA, and the display area DA and the non-display area NDA of the first display panel 100 together may define a whole planar area of the first display panel 100.

The display area DA of the first display panel 100 may include a first electrode 160 (shown in FIG. 2) provided in plural (also referred to as a pixel electrode), wirings which transmit a driving signal for driving the first electrodes (not shown) and a thin film transistor TR (shown in FIG. 2) provided in plural. The non-display area NDA of the first display panel 100 may include a driving unit (not shown) disposed therein which applies driving signals to the display area DA through the wirings.

The second display panel 200 facing the first display panel 100 may be coupled to the first display panel 100. The second display panel 200 may include a display area (not visible in FIG. 1) and a non-display area (not visible in FIG. 1) each corresponding respectively to the display area DA and the non-display area NDA of the first display panel 100. The display area and the non-display area of the second display panel 200 will hereinafter also be designated as DA and NDA, respectively.

The sealing member 300 may be interposed between the first display panel 100 and the second display panel 200 in the non-display areas NDAs of the first display panel 100 and the second display panel 200 so as to enclose the display areas DAs thereof. More specifically, the sealing member 300 may couple a first substrate 110 (shown in FIG. 2) of the first display panel 100 and a second substrate 210 (shown in FIG. 2) of the second display panel 200 to each other.

A first dam 180 and a second dam 230 may be disposed in the respective non-display areas NDAs of the first display panel 100 and the second display panel 200 adjacent to the display areas DAs, so as to enclose the respective display areas DAs. The first dam 180 and the second dam 230 will be described in detail later.

The configuration of the display device 10 will hereinafter be described in detail.

Figure 2:
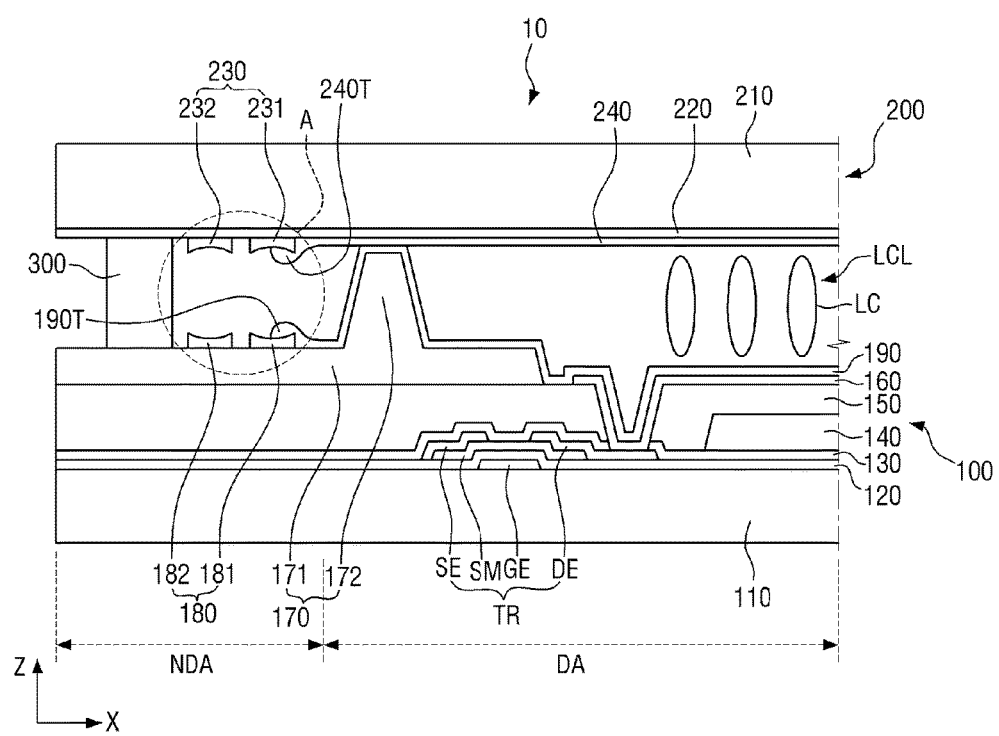
FIG. 2 is a cross-sectional view taken along line I-I' of FIG. 1.
Figure 3:
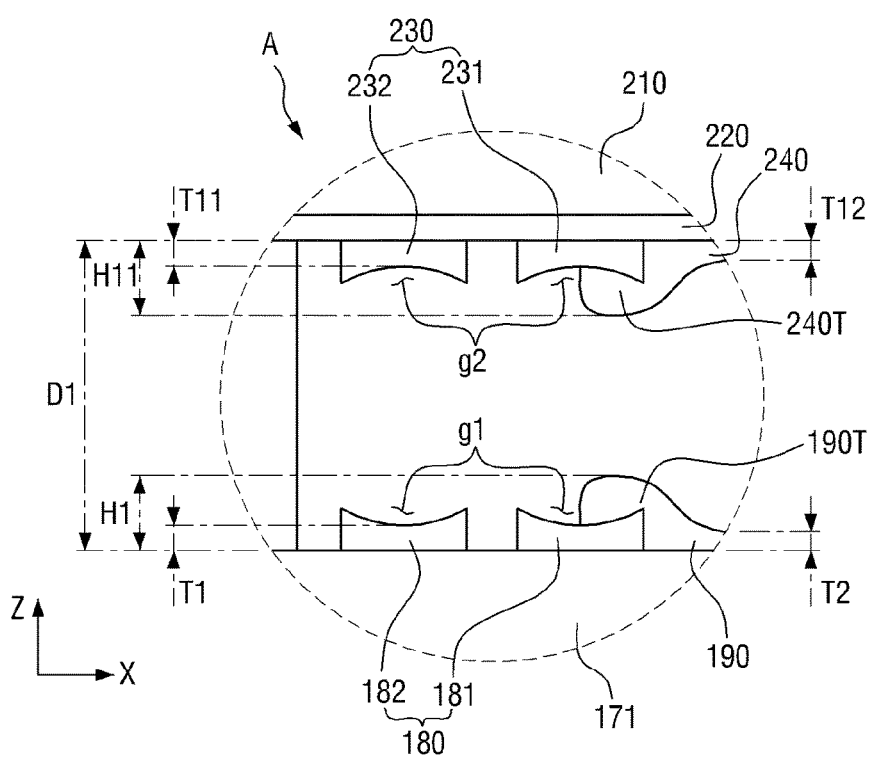
FIG. 3 is an enlarged cross sectional view of portion A of FIG. 2.

FIG. 2 is a cross sectional view taken along line I-I' of FIG. 1, and FIG. 3 is an enlarged cross-sectional view of portion A of FIG. 2.

Referring to FIG. 2 and FIG. 3, the first display panel 100 of the display device 10 may include the first substrate 110, the thin film transistor TR, a first insulation layer 120, a second insulation layer 130, a color filter 140, a third insulation layer 150, the first electrode 160 (also referred to as a pixel electrode), a black column spacer 170, the first dam 180 and a first alignment layer 190, which are stacked in a third direction Z perpendicular to the first direction X.

The first substrate 110 may include the display area DA and the non-display area NDA defined in the first display panel 100. The first substrate 110 may include an insulation material such as transparent glass, quartz, ceramic, silicon, transparent plastic or the like, and can be properly selected as needed by a person skilled in the art. In some exemplary embodiments, the first substrate 110 may have flexibility. That is, the first substrate 110 may be a transformable substrate which can be deformed such as by being rolled, folded, bent and so on.

The thin film transistor TR may be disposed in the display area DA on the first substrate 110, and include a gate electrode GE connected to a gate line (not shown), a semiconductor layer SM, and a source electrode SE, and a drain electrode DE connected to a data line (not shown).

The gate electrode GE may be disposed in the display area DA on the first substrate 110, and protrude toward the semiconductor layer SM from the gate line (not shown) extending in the first direction X in the top plan view. The gate electrode GE may be in a same layer of the first display panel 100 as the gate line among layers disposed on the first substrate 110. The gate electrode GE may include any one of indium tin oxide ("ITO"), indium zinc oxide ("IZO") and indium tin zinc oxide ("ITZO"). Furthermore, the gate electrode GE may have a two-layer structure including a first electrode layer including or made of the aforementioned material and a second electrode layer including or made of the below mentioned material. The second electrode layer may include or be made of a metal such as copper (Cu), molybdenum (Mo), aluminum (Al), tungsten (W), chrome (Cr) and titanium (Ti), or an alloy including at least one of the metals.

The semiconductor layer SM may be disposed on the gate electrode GE with the first insulation layer 120 therebetween. The semiconductor layer SM may include an active material layer provided on the first insulation layer 120 and an ohmic contact layer provided on the active material layer. The semiconductor layer SM may be interposed between the data line (not shown) extending in the second direction Y in the top plan view and the first insulation layer 120.

The source electrode SE may be disposed on the semiconductor layer SM, and overlapped with the gate electrode GE on a plane. The source electrode SE may protrude from the data line (not shown) in the top plan view. The drain electrode DE may be spaced apart from the source electrode SE with respect to the semiconductor layer SM, and overlapped with the gate electrode GE. The source electrode SE and the drain electrode DE may include or be made of a metal such as copper (Cu), molybdenum (Mo), aluminum (Al), tungsten (W), chrome (Cr) and titanium (Ti), or an alloy including at least one of the metals. The source electrode SE and the drain electrode DE may be overlapped with the semiconductor layer SM in an area excluding an exposed gap portion of the semiconductor layer SM disposed between the source electrode SE and the drain electrode DE.

The first insulation layer 120 may be disposed in the display area DA and the non-display area NDA on the first substrate 110, and interposed between the gate electrode GE and the semiconductor layer SM so as to electrically insulate the gate electrode GE and the semiconductor layer SM from each other. The first insulation layer 120 may include an insulation material, for example, silicon nitride or silicon oxide. The data line (not shown) may be disposed on the first insulation layer 120. As each being disposed on first insulation layer 120, the source electrode SE and the drain electrode DE may be in a same layer of the first display panel 100 as the data line among layers disposed on the first substrate 110.

The second insulation layer 130 may be disposed in the display area DA and the non-display area NDA on the first insulation layer 120, and cover the source electrode SE and the drain electrode DE. The second insulation layer 130 may have a through hole defined therein which exposes the drain electrode DE. The second insulation layer 130 may include an insulation material, for example, silicon nitride or silicon oxide.

The color filter 140 may be disposed on the second insulation layer 130 so as to correspond to each pixel of the display area DA. The color filter 140 may provide colors to the light passing through the liquid crystal layer LCL, and display one of red, green and blue color filters through a red color filter, a green color filter or a blue color filter, respectively. However, the color filter 140 is not limited to the above mentioned color filters.

The third insulation layer 150 may be disposed in the display area DA and the non-display area NDA on the second insulation layer 130, and cover the color filter 140. The third insulation layer 150 may be a planarized layer and protect the color filter 140. Like the second insulation layer 130, the third insulation layer 150 may include a through hole defined therein which exposes the drain electrode DE.

The third insulation layer 150 may include an insulation material, for example, an organic insulation material. In some exemplary embodiments, the third insulation layer 150 may include an inorganic insulation material, for example, silicon nitride or silicon oxide.

The first electrode 160 may be disposed on the second insulation layer 130 so as to correspond to each pixel of the display area DA. The first electrode 160 may be electrically connected to the drain electrode DE at the through holes defined in the second and third insulation layers 130 and 150 described above. The first electrode 160 may include a transparent conductive material, for example, any one of indium tin oxide ("ITO"), indium zinc oxide ("IZO") and indium tin zinc oxide ("ITZO").

The black column spacer 170 may be disposed on the third insulation layer 150 at regions excluding a portion of each pixel. The black column spacer 170 may include a light blocking portion 171 and a spacer portion 172. Portions of the black column spacer 170 may define the light blocking portion 171 thereof and the spacer portion 172 thereof.

The light blocking portion 171 may be disposed in the non-display area NDA of a display substrate and in the display area DA thereof at a non-pixel area such as in which the thin film transistor TR is disposed. In an exemplary embodiment, for example, the light blocking portion 171 may be interposed between the third insulation layer 150 and the first dam 180 which will be described later. The light blocking portion 171 may be overlapped with the gate line (not shown), the data line (not shown) and the thin film transistor TR in non-pixel areas of the display area DA. The light blocking portion 171 may include or be made of a light blocking material so as to block unnecessary light in realizing an image. IN an exemplary embodiment, for example, the light blocking portion 171 may reduce or effectively prevent light leakage which can occur at an edge of the liquid crystal layer LCL or color mixture which can occur at an edge of the color filter 140. Although the light blocking portion 171 is depicted as not being overlapped with the edge of the color filter 140 in FIG. 2, in an alternative exemplary embodiment, the light blocking portion 171 may be overlapped with the edge of the color filter 140.

The spacer portion 172 may be disposed on the light blocking portion 171 and may not be overlapped with the first dam 180 which will be described later. The spacer portion 172 may maintain a cell gap between the first display panel 100 and the second display panel 200. The spacer portion 172 may be provided in an area corresponding to the thin film transistor TR, but the invention is not limited thereto. The spacer portion 172 is depicted in FIG. 2 as including or being made of a material same as that of the light blocking portion 171 and formed integrally with the light blocking portion 171, but the invention is not limited thereto.

The first dam 180 may be disposed in a portion of the non-display area NDA adjacent to the display area DA, on the first substrate 110. Specifically, the first dam 180 may be disposed in a portion of the non-display area NDA adjacent to the display area DA on the light blocking portion 171 of the black column spacer 170. In an exemplary embodiment of forming the first alignment layer 190 on the first electrode 160 such as by inkjet printing, the first dam 180 may inhibit an alignment solids-containing alignment solution discharged onto the first electrode 160 in the display area DA from being diffused toward the non-display area NDA due to diffusion properties of the alignment solution. The first dam 180 may include a first stopper 181 extending on the light blocking portion 171 of the black column spacer 170 so as to enclose the display area DA and form a closed curve in the top plan view, and a second stopper 182 arranged outside the first stopper 181 relative to the display area DA so as to be spaced apart from the first stopper 181 and extended to enclose the first stopper 181 and form a closed curve in the top plan view. This will be described in detail later.

The first alignment layer 190 may be disposed to cover the display area DA of the first substrate 110, specifically, the first electrode 160 and the black column spacer 170 disposed in the display area DA. At least a portion of the first alignment layer 190 in the display area DA may extend to the non-display area NDA of the first substrate 110 and terminate at the first stopper 181 of the first dam 180. An extended portion 190T of the first alignment layer 190 may be overlapped with a recessed groove g1 (shown in FIG. 3) of the first stopper 181. The extended portion 190T terminates at the first stopper 181. This structure is advantageous in a method of manufacturing a liquid crystal display deice, in that, when forming the first alignment layer 190 on the first electrode 160 in the display area DA by a printing process such as an inkjet printing process, the first stopper 181 has lyophobic properties with respect to the alignment solution discharged onto the first electrode 160 and the black column spacer 170 in the display area DA so as to inhibit the alignment solution from flowing from the display area DA toward the non-display area NDA, and resisting force against the alignment solution flowing toward the non-display area NDA is increased by the groove g1 (shown in FIG. 3). In an exemplary embodiment of a method of manufacturing a liquid crystal display deice, when forming the first alignment layer 190, the whole surface of the first substrate 110 on which the black column spacer 170 is formed may be treated to have hydrophilic properties so as to increase wettability of the first electrode 160 and the black column spacer 170 with respect to the alignment solution.

The first alignment layer 190 may serve to initially align liquid crystal molecules LC of the liquid crystal layer LCL, and include at least one of organic polymer materials such as polyimide, polyamic acid and polysiloxane.

The second display panel 200 may include the second substrate 210, a second electrode 220 (also referred to as a common electrode), the second dam 230 and a second alignment layer 240.

The second substrate 210 may include the display area DA and the non-display area NDA defined in the second display panel 200. The second substrate 210 may be coupled to the first substrate 110 facing the second substrate 210, and may have a total planar size smaller than that of the first substrate 110 (refer to FIG. 1). Thus, the second substrate 210 may expose a portion of the non-display area NDA of the first substrate 110 while covering the display area DA of the first substrate 110. Like the first substrate 110, the second substrate 210 may include an insulation material such as transparent glass, quartz, ceramic, silicon, transparent plastic or the like, and can be properly selected as needed by a person skilled in the art. In some exemplary embodiments, the second substrate 210 may have flexibility. That is, the second substrate 210 may be a transformable substrate which can be deformed such as by being rolled, folded, bent and so on.

The second electrode 220 may be disposed over an entire of the display area DA and the non-display area NDA on the second substrate 210. The second electrode 220 may receive a common voltage applied from a common line (not shown) and cooperate with the first electrode 160 so as to generate an electric field for controlling an alignment direction of the liquid crystal molecules LC in the liquid crystal layer LCL. The second electrode 220 may include a transparent conductive material. The second electrode 220 may include, for example, indium tin oxide ("ITO") or indium zinc oxide ("IZO"), but the present disclosure is not limited thereto.

The second dam 230 may be disposed in a portion of the non-display area NDA adjacent to the display area DA on the second substrate 210. Specifically, the second dam 230 may be disposed in a portion of the non-display area NDA adjacent to the display area DA on the second electrode 220. In an exemplary embodiment of forming the second alignment layer 240 on the second electrode 220 such as by inkjet printing, the second dam 230 may inhibit an alignment solution discharged on the second electrode 220 in the display area DA from being diffused toward the non-display area NDA due to diffusion properties of the alignment solution. The second dam 230 may include a third stopper 231 extending on the second electrode 220 so as to enclose the display area DA and form a closed curve in the top plan view, and a fourth stopper 232 arranged outside the third stopper 231 relative to the display area DA so as to be spaced apart from the third stopper 231 and extended to enclose the third stopper 231 and form a closed curve in the top plan view. This will be described in detail later.

The second alignment layer 240 may be disposed to cover the display area DA of the second substrate 210, specifically, the second electrode 220. At least a portion of the second alignment layer 240 in the display area DA may extend to the non-display area NDA of the second substrate 210 and terminate at the third stopper 231 of the second dam 230. An extended portion 240T of the second alignment layer 240 may be overlapped with a recessed groove g2 (shown in FIG. 3) of the third stopper 231. The extended portion 240T terminates at the third stopper 231. This structure is advantageous in a method of manufacturing a liquid crystal display deice, in that, when forming the second alignment layer 240 on the second electrode 220 in the display area DA by a printing process such as an inkjet printing process, the third stopper 231 has lyophobic properties with respect to the alignment solution discharged onto the second electrode 220 in the display area DA so as to inhibit the alignment solution from flowing toward the non-display area NDA, and resisting force against the alignment solution flowing toward the non-display area NDA is increased by the groove g2 (shown in FIG. 3). In an exemplary embodiment of a method of manufacturing a liquid crystal display device, when forming the second alignment layer 240, the whole surface of the second substrate 210 on which the second electrode 220 is formed may be treated to have hydrophilic properties so as to increase wettability of the second electrode 220 with respect to the alignment solution.

Like the first alignment layer 190, the second alignment layer 240 may serve to initially align the liquid crystal molecules LC of the liquid crystal layer LCL, and include at least one of organic polymer materials such as polyimide, polyamic acid and polysiloxane.

The sealing member 300 may be interposed between an edge portion of the non-display area NDA of the first display panel 100 and an edge portion of the non-display area NDA of the second display panel 200, and extended to enclose the-display area DA of the first display panel 100 and the non-display area NDA of the second display panel 200 and form a closed curve in the top plan view.

As described above, the sealing member 300 for coupling the first display panel 100 and the second display panel 200 to each other may be bonded to the black column spacer 170 and the second electrode 220 but is not limited thereto. The sealing member 300 may include or be formed of an adhesive such as a sealant, but the invention is not limited thereto.

The liquid crystal layer LCL may be interposed between the display area DA of the first display panel 100 and the display area DA of the second display panel 200, specifically, between the first alignment layer 190 and the second alignment layer 240. The liquid crystal layer LCL may include the liquid crystal molecules LC having a positive dielectric anisotropy or a negative dielectric anisotropy.

The configuration of the first and second dams 180 and 230 and an arrangement relationship between the first and second dams 180 and 230 and the first and second alignment layers 190 and 240 will hereinafter be explained in more detail.

Figure 4:
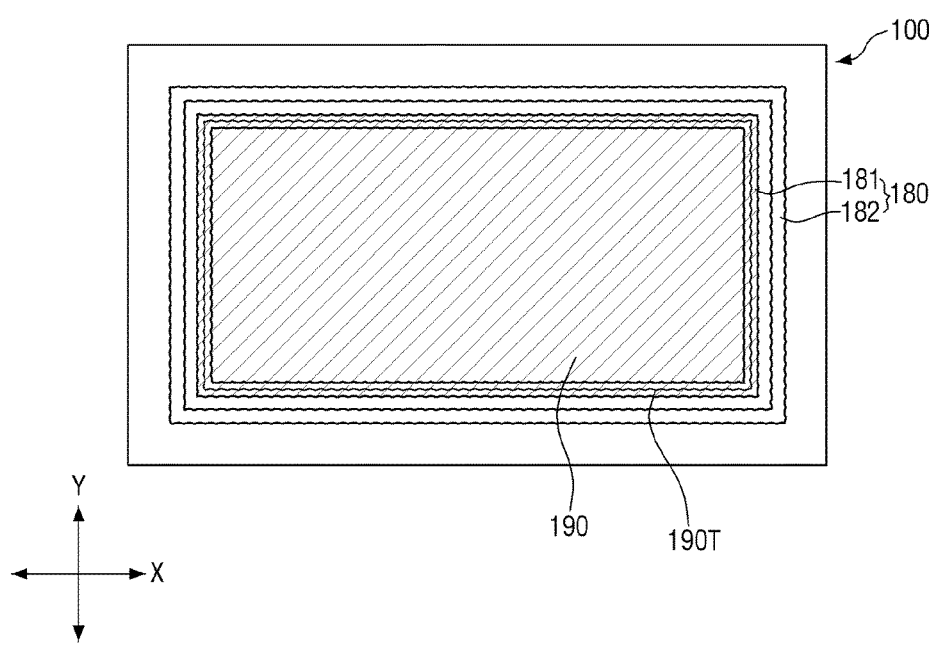
FIG. 4 is a top plan view illustrating an exemplary embodiment of an arrangement relationship between a first dam and an alignment layer of FIG. 2.

FIG. 3 is an enlarged cross-sectional view of portion A of FIG. 2, and FIG. 4 is a top plan view illustrating an exemplary embodiment of an arrangement relationship between the first dam and the alignment layer of FIG. 2. FIG. 4 illustrates only the first display panel 100 including the first alignment layer 190, where the first dam 180 and the first alignment layer 190 are illustrated exaggerated for better understanding.

Referring to FIG. 1 and FIG. 3, lengths of each of the first stopper 181 and the second stopper 182 of the first dam 180 may extend in extension directions thereof to enclose the display area DA (shown in FIG. 2) of the first substrate 110 (shown in FIG. 2) and form a closed curve in the top plan view. Each of the first stopper 181 and the second stopper 182 may have the recessed groove g1 defined at an upper surface (e.g., distal end) thereof. In particular, the recessed groove g1 may extend formed in the extension direction of the respective dam.

In an exemplary embodiment, for example, each of the first stopper 181 and the second stopper 182 may have an edge thereof thicker than a center thereof in the direction perpendicular to the extension direction thereof (e.g., the third direction Z). The first stopper 181 and the second stopper 182 may be shaped as described above due to a "coffee ring effect" which may be caused in the process of discharging a stopper solution containing stopper solids onto the light blocking portion 171 of the black column spacer 170 and drying the stopper solution in a printing process such as an inkjet printing process.

Referring to FIG. 3, a minimum thickness T1 of each of the first stopper 181 and the second stopper 182 may be equal to or less than a thickness T2 of the first alignment layer 190 disposed on the first electrode 160 in the display area DA. The thickness T1 may be a maximum thickness of the first alignment layer 190 disposed on the first electrode 160 in the display area DA. In an exemplary embodiment of manufacturing a liquid crystal display device, the first stopper 181 and the second stopper 182 may be formed by controlling the type of the alignment solution, concentration of stopper solids and/or an alignment solution drying condition in a printing process. Since each of the first stopper 181 and the second stopper 182 may be formed by a printing process such as an inkjet printing process, edges of each of the first stopper 181 and the second stopper 182 may be uneven along the extension direction thereof in the plan view as shown in FIG. 4.

Each of the first stopper 181 and the second stopper 182 thus configured may increase, through the respective grooves g1 thereof, resisting force against the alignment solution discharged on the first electrode 160 in the display area DA (shown in FIG. 2) flowing toward the non-display area NDA when forming the first alignment layer 190 by a printing process such as an inkjet printing process. The alignment solution may be first controlled by the first stopper 181 such that diffusion of the alignment solution from the display area DA to the non-display area NDA is reduced or effectively prevented. However, when the diffusion of the alignment solution is not controlled by the first stopper 181 such as due to force applied from an external source, diffusion of the alignment solution further into the non-display area NDA can be controlled by the second stopper 182.

FIG. 3 and FIG. 4 taken together illustrate a configuration in that the alignment solution is controlled by the first stopper 181 without having any particular external force applied thereto so that diffusion of the alignment solution to the non-display area NDA is reduced or effectively prevented. The extended portion 190T of the first alignment layer 190 formed by drying the alignment solution may be overlapped with only a portion of the first stopper 181. If no particular external force is provided when the alignment solution is discharged on the first electrode 160 in the display area DA (shown in FIG. 2), the second stopper 182 may be omitted.

Furthermore, the first stopper 181 and the second stopper 182 may include a material having lyophobic properties with respect to the alignment solution in order to increase an effect of controlling the alignment solution such that diffusion of the alignment solution to the non-display area NDA is reduced or effectively prevented. That is, the first stopper 181 and the second stopper 182 may include a material different from the material of the first alignment layer 190. In an exemplary embodiment, for example, the first stopper 181 and the second stopper 182 may include a material which is a polyimide-based material constituting the first alignment layer 190 but has different ingredients.

Since the first stopper 181 and the second stopper 182 may have lyophobic properties with respect to the alignment solution, the alignment solution may be formed into a shape, for example, which is convex at the first stopper 181. As the convex shape, the extended portion 190T of the first alignment layer 190 which is formed by drying the alignment solution and contacts or overlaps the first stopper 181, may have a thickness greater than a remaining portion of the first alignment layer 190 such as a portion overlapping the first electrode 160 (shown in FIG. 2) disposed in the display area DA (shown in FIG. 2) of the first substrate 110 (shown in FIG. 2). A height H1 between a base of the first stopper 181 facing the first substrate 110 and a highest point of the first alignment layer 190 may be less than half a distance D1 between the base of the first stopper 181 facing the first substrate 110 and the base of the third stopper 231 facing the second substrate 210. With the height H1 less than half the distance D1, interference between the extended portion 190T of the first alignment layer 190 and the extended portion 240T of the second alignment layer 240 may be reduced or effectively prevented during coupling the first display panel 100 and the second display panel 200 to each other, thereby maintaining a predetermined cell gap between the first display panel 100 and the second display panel 200.

Referring again to FIG. 1 and FIG. 3, lengths of each of the third stopper 231 and the fourth stopper 232 of the second dam 230 may extend in an extension direction thereof to enclose the display area DA of the second substrate 210 and form a closed curve in the top plan view. Each of the third stopper 231 and the fourth stopper 232 may have the recessed groove g2 defined at an upper surface (e.g., distal end) thereof. In particular, the recessed groove g2 may extend in the extension direction of the respective dam.

In an exemplary embodiment, for example, each of the third stopper 231 and the fourth stopper 232 may have an edge thereof thicker than a center thereof in the direction perpendicular to the extension direction thereof (e.g., the third direction Z). The third stopper 231 and the fourth stopper 232 may be shaped as described above due to the "coffee ring effect" which may be caused in the process of discharging a stopper solution onto the second electrode 220 and drying the stopper solution in a printing process such as an inkjet printing process.

Referring to FIG. 3, a minimum thickness T11 of each of the third stopper 231 and the fourth stopper 232 may be equal to or less than a thickness T12 of the second alignment layer 240 disposed on the second electrode 220 in the display area DA. The thickness T2 may be a maximum thickness of the second alignment layer 240 disposed on the second electrode 220 in the display area DA. In an exemplary embodiment of manufacturing a liquid crystal display device, the third stopper 231 and the fourth stopper 232 may be formed by controlling the type of the alignment solution, concentration of stopper solids and/or an alignment solution drying condition in a printing process. Since each of the third stopper 231 and the fourth stopper 232 may be formed by a printing process such as an inkjet printing process, edges of each of the third stopper 231 and the fourth stopper 232 may be uneven along the extension direction thereof in the top plan view like the first stopper 181 and the second stopper 182.

Each of the third stopper 231 and the fourth stopper 232 thus configured may increase, through the respective grooves g2 thereof, resisting force against the alignment solution discharged on the second electrode 220 in the display area DA flowing toward the non-display area NDA when forming the second alignment layer 240 by a printing process such as an inkjet printing process. The alignment solution may be first controlled by the third stopper 231 such that diffusion of the alignment solution to the non-display area NDA is reduced or effectively prevented. However, when the diffusion of the alignment solution is not controlled by the third stopper 231 such as due to force applied from an external source, diffusion of the alignment solution further into the non-display area NDA can be controlled by the fourth stopper 232.

FIG. 3 and FIG. 4 taken together illustrates a configuration in that the alignment solution is controlled by the third stopper 231 without having any particular external force so that diffusion of the alignment solution to the non-display area NDA is reduced or effectively prevented. The extended portion 240T of the second alignment layer 240 formed by drying the alignment solution may be overlapped with only a portion of the third stopper 231. If no particular external force is provided when the alignment solution is discharged on the second electrode 220 in the display area DA, the fourth stopper 232 may be omitted.

Furthermore, the third stopper 231 and the fourth stopper 232 may include a material having lyophobic properties with respect to the alignment solution in order to increase an effect of controlling the alignment solution such that diffusion of the alignment solution to the non-display area NDA is reduced or effectively prevented. That is, the third stopper 231 and the fourth stopper 232 may include a material different from the material of the second alignment layer 240. In an exemplary embodiment, for example, the third stopper 231 and the fourth stopper 232 may include a material which is a polyimide-based material constituting the second alignment layer 240 but has different ingredients.

Since the third stopper 231 and the fourth stopper 232 may have lyophobic properties with respect to the alignment solution, the alignment solution may be formed into a shape, for example, which is convex in a portion of the third stopper 231. As the convex shape, the extended portion 240T of the second alignment layer 240 which is formed by drying the alignment solution and contacts or overlaps the third stopper 231, may have a thickness greater than a remaining portion of the second alignment layer 240 such as a portion overlapping the second electrode 220 (shown in FIG. 2) disposed in the display area DA (shown in FIG. 2) of the second substrate 210 (shown in FIG. 2). A height H11 between a base of the third stopper 231 facing the second substrate 210 and a lowest point of the second alignment layer 240 may be less than half the distance D1 between the base of the first stopper 181 facing the first substrate 110 and the base of the third stopper 231 facing the second substrate 210.

Although the first dam 180 is illustrated as having two stoppers 181 and 182, in an alternative exemplary embodiment of the invention, the first dam 180 may have two or more stoppers. Furthermore, although the second dam 230 is illustrated as having two stoppers 231 and 232, in an alternative exemplary embodiment, the second dam 230 may have two or more stoppers.

Figure 5:
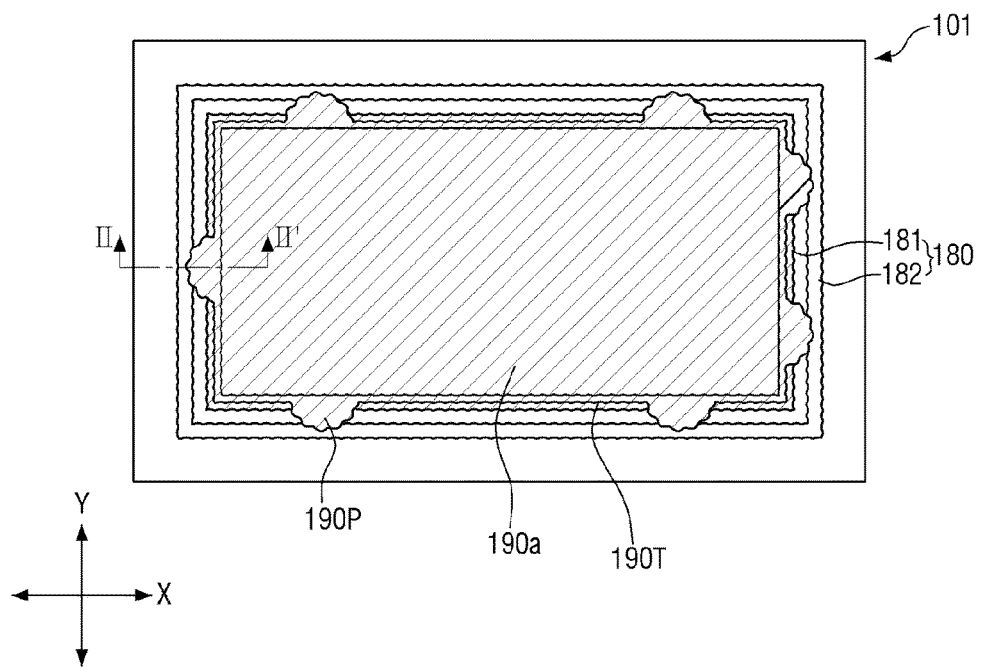
FIG. 5 is a top plan view illustrating another exemplary embodiment of an arrangement relationship between a first dam and an alignment layer of FIG. 2.
Figure 6:
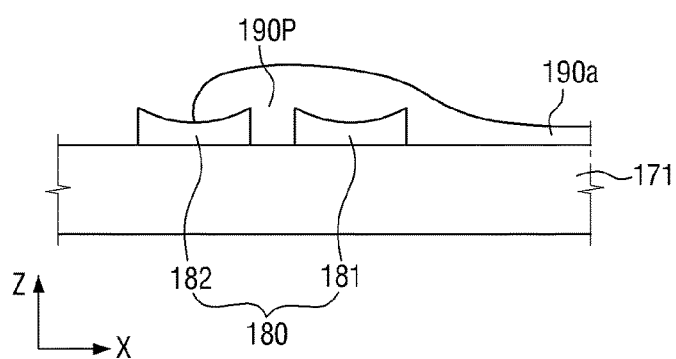
FIG. 6 is a cross-sectional view taken along line II-II' of FIG. 5.

FIG. 5 is a top plan view illustrating another exemplary embodiment of an arrangement relationship between a first dam and an alignment layer of FIG. 2, and FIG. 6 is a cross-sectional view taken along line II-II' of FIG. 5. FIG. 6 illustrates only a first display panel 101 including a first alignment layer 190a, where the first dam 180 and the first alignment layer 190a are illustrated exaggerated for better understanding.

FIG. 3, FIG. 5 and FIG. 6 taken together illustrate an example in which a protruded portion 190P of the first alignment layer 190a terminates at the second stopper 182 of the first display panel 100 and at the fourth stopper 232 of the second display panel 200. Similarly, a protruded portion (not shown) of the second alignment layer 240 terminates at the second stopper 182 of the first display panel 100 and at the fourth stopper 232 of the second display panel 200.

This structure may be formed when alignment solutions are respectively discharged on the first electrode 160 (shown in FIG. 2) and on the second electrode 220 in the display area DA. A portion of alignment solutions of which diffusion is respectively firstly controlled by the first stopper 181 of the first display panel 100 and the second stopper 231 of the second display panel 200 flows toward the second stopper 182 of the first display panel 100 and the fourth stopper 232 of the second display panel 200 by an external force generated when moving the first substrate 110 (shown in FIG. 2) and the second substrate 210 (shown in FIG. 2) to undergo a drying and/or hardening process for example, and is stopped by the second stopper 182 and the fourth stopper 232.

As described above, one or more exemplary embodiment of the display device 10 according to the invention increases resisting force against diffusion of the alignment layer solution flowing from the display area DA toward the non-display area NDA when forming the first alignment layer 190 and the second alignment layer 290 by a printing process such as an inkjet printing process. The resisting force is increased by the display device including the first dam 180 which is disposed in a portion of the non-display area NDA adjacent to the display region DA on the first substrate 110 and which includes the first stopper 181 having the recessed groove g1 at the surface thereof, and the second dam 230 which is disposed in a portion of the non-display area NDA adjacent to the display region DA on the second substrate 210 and which includes the third stopper 231 having the recessed groove g2 at the surface thereof.

Thus, since diffusion of alignment layer solution into the non-display area is reduced or effectively prevented, an increase in an overall width of the non-display area NDA in the first direction X and the second direction Y of the display device 10 is suppressed, thereby realizing a relatively slim (e.g., narrow) bezel.

In an exemplary embodiment of the invention, although the first dam 180 is illustrated as being disposed on the black column spacer 170 provided on the first substrate 110, the invention is not limited thereto. In an exemplary embodiment, for a liquid crystal display device which has no column spacer, the first dam 180 may be disposed on a planarizing layer, a passivation layer or a black matrix provided on the first substrate depending on a model of the display device.

An exemplary embodiment of method for manufacturing the display device 10 according to the invention will now be described.

FIG. 7 to FIG. 14 are cross-sectional views illustrating intermediate process steps of an exemplary embodiment of a method for manufacturing a display device according to the invention.

Figure 7:
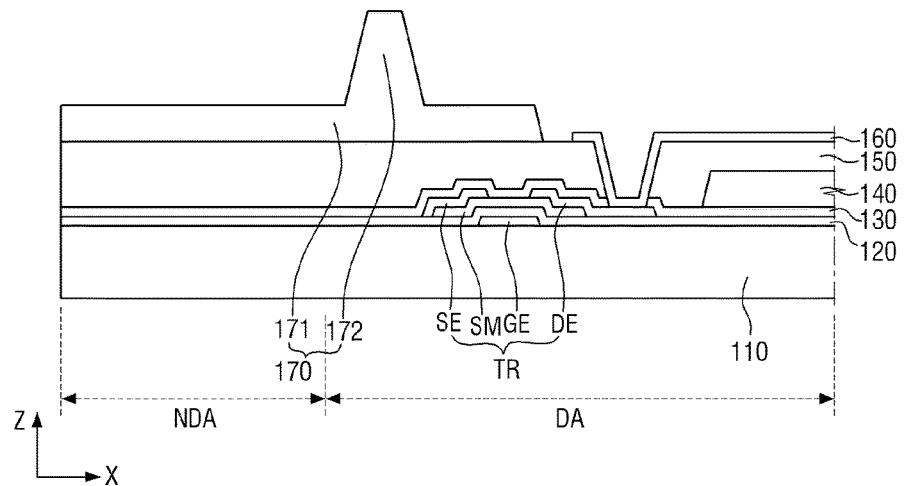
FIG. 7 to FIG. 14 are cross-sectional views illustrating intermediate process steps of an exemplary embodiment of a method for manufacturing a display device according to the invention.

Referring first to FIG. 7, the first substrate 110 including the display area DA and the non-display area NDA which is arranged outside the display area DA so as to enclose the display area DA is prepared. The thin film transistor TR, the first insulation layer 120, the second insulation layer 130, the color filter 140, the third insulation layer 150, the first electrode 160 and the black column spacer 170 may be stacked on the first substrate 110 in the third direction Z. This configuration has been described in detail above, and thus the duplicated description thereof will be omitted.

Figure 8:
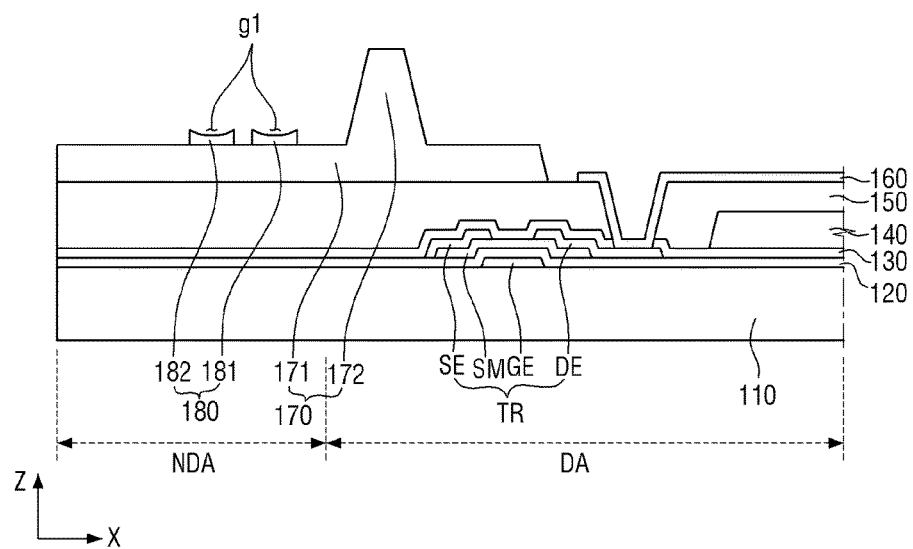

Referring then to FIG. 8, the first dam 180 may be formed at a portion of the non-display area NDA adjacent to the display area DA, on the first substrate 110. The first dam 180 may include the first stopper 181 of which lengths thereof extend to enclose the display area DA of the first substrate 110 and form a closed curve in the top plan view, and the second stopper 182 which is arranged outside the first stopper 181 and spaced apart from the first stopper 181. Lengths of the second stopper 182 may be extended to enclose the first stopper 181 and form a closed curve in the top plan view.

Each of the first stopper 181 and the second stopper 182 may be formed by discharging and drying a stopper solution containing stopper solids through a printing process such as an inkjet printing process. The alignment solution containing alignment solids which will be described later may have lyophobic properties with respect to the stopper solids, and the stopper solids may include a material different from the material of the alignment solids. In an exemplary embodiment, for example, the stopper solids may be a polyimide-based material but may include a material having a different ingredient than that of the alignment solution. An amount of the stopper solids may be about 35 weight percent (wt %) or higher with respect to a total weight of the stopper solution. For the above-described solids, the viscosity of the stopper solution increases, which may reduce undesired diffusion of the stopper solution when the stopper solution is discharged onto the first substrate 110 such as by printing. The drying process can be a natural (e.g., unassisted) drying process. In some exemplary embodiments, for a non-natural drying process, the stopper solution may be dried through a pre-baking process at a relatively low temperature. Since each of the first stopper 181 and the second stopper 182 may be formed through a printing process such as an inkjet printing process, each of the first stopper 181 and the second stopper 182 may have the recessed groove g1 respectively formed at upper surfaces thereof by the "coffee ring effect" during a drying process. Lengths of the recessed groove g1 may extend along lengths of the respective stopper.

As described above, since the first dam 180 is formed by a printing process such as an inkjet printing process, a separate patterning process for forming the dam is not used even for a modified display device 10 in which the color filter, the column spacer or the black matrix is not provided on the first substrate 110. Thus, manufacturing processes for the display device 10 can be simplified.

Figure 9:
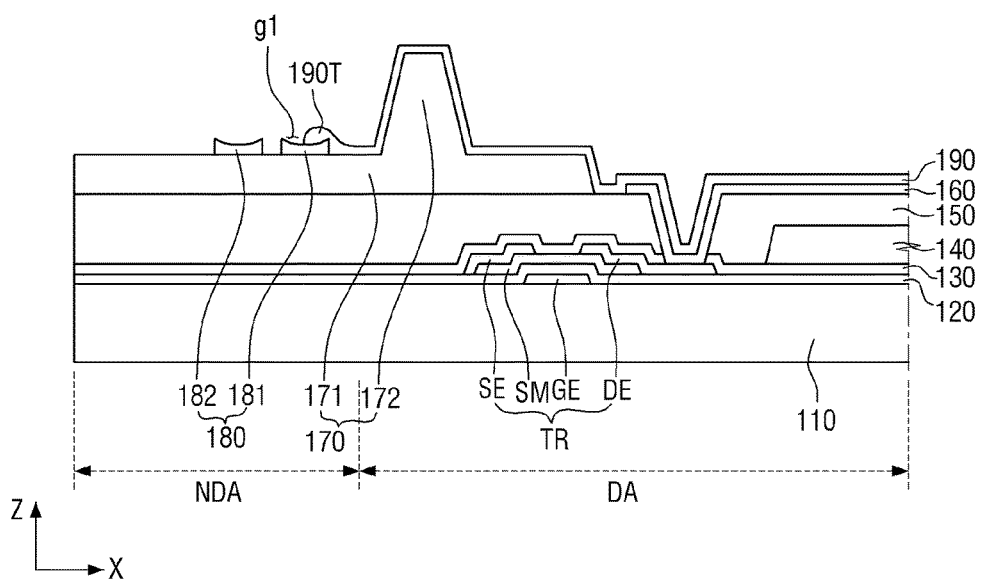

Referring next to FIG. 9, the first alignment layer 190 may be formed in the display area DA of the first substrate 110, specifically, on the first electrode 160 and the black column spacer 170. The first alignment layer 190 may be formed by discharging and drying the alignment solution containing alignment solids on the first electrode 160 and the black column spacer 170 through a printing process such as an inkjet printing process. The alignment solids may include at least one of organic polymer materials such as polyimide, polyamic acid and polysiloxane. An amount of the alignment solids may be about 3.5 wt % with respect to a total weight of the alignment solution. For the above-described solids, the viscosity of the alignment solution decreases, which enables the alignment solution to be uniformly diffused on the first substrate 110 and the black column spacer 170 when the alignment solution is discharged on the first substrate 110 and the black column spacer 170 such as by printing. The drying process can be a natural (e.g., unassisted) drying process. In some exemplary embodiments, for a non-natural drying process, the alignment solution may be formed into the first alignment layer 190 having a relatively firm shape through a pre-baking process at a relatively low temperature and a main-baking process at a temperature higher than that of the pre-baking process. By the above-described drying processes of the alignment solution, the first dam 180 may also be formed into a relatively firm shape.

Figure 10:
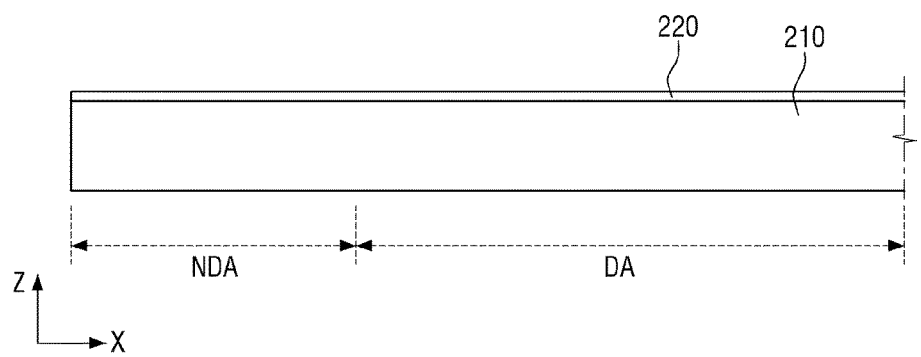

Referring next to FIG. 10, the second substrate 210 including the display area DA and the non-display area NDA which is arranged outside the display area DA so as to enclose the display area DA is prepared. The second substrate 210 may include a second electrode 220 disposed on the whole surface of the second substrate 210. This configuration has been described in detail above and duplicated description thereof will be omitted.

Figure 11:
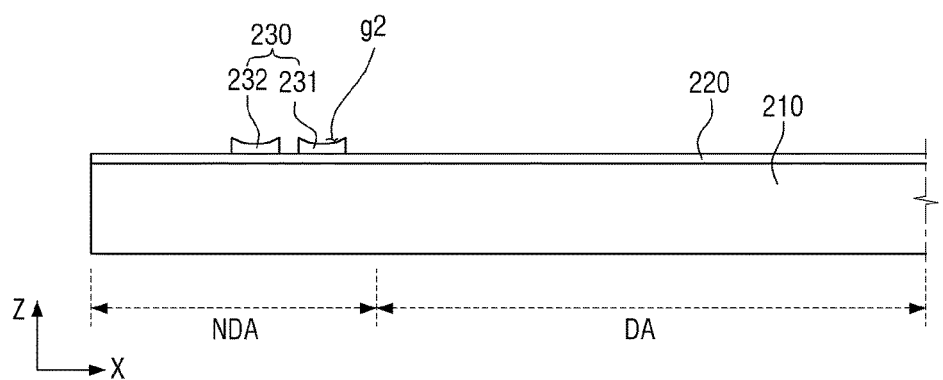

Referring to FIG. 11, the second dam 230 may be formed at a portion of the non-display area NDA adjacent to the display area DA, on the second substrate 210. The second dam 230 may include the third stopper 231 of which lengths thereof extend to enclose the display area DA of the second substrate 210 and form a closed curve in the top plan view, and the fourth stopper 232 which is arranged outside the third stopper 231 and spaced apart from the third stopper 231. Lengths of the fourth stopper 232 may be extended to enclose the third stopper 231 and form a closed curve in the top plan view. The third stopper 231 and the fourth stopper 232 may have the groove g2 respectively at upper surfaces thereof.

The third stopper 231 and the fourth stopper 232 may be formed through the method similar to the method of forming the first stopper 181 and the second stopper 182 illustrated in FIG. 8, but is are not limited thereto. In an exemplary embodiment, the method of forming the third stopper 231 and the fourth stopper 232 may be different from the method of forming the first stopper 181 and the second stopper 182 with respect to discharging the stopper solution on the second electrode 220. Therefore, duplicated description thereof will be omitted.

As described above, since the second dam 230 is formed by a printing process such as an inkjet printing process, a separate patterning process for forming the dam is not used even for a modified display device 10 in which the color filter, the column spacer or the black matrix is not provided on the first substrate 110. Thus, manufacturing processes for the display device 10 can be simplified.

Figure 12:
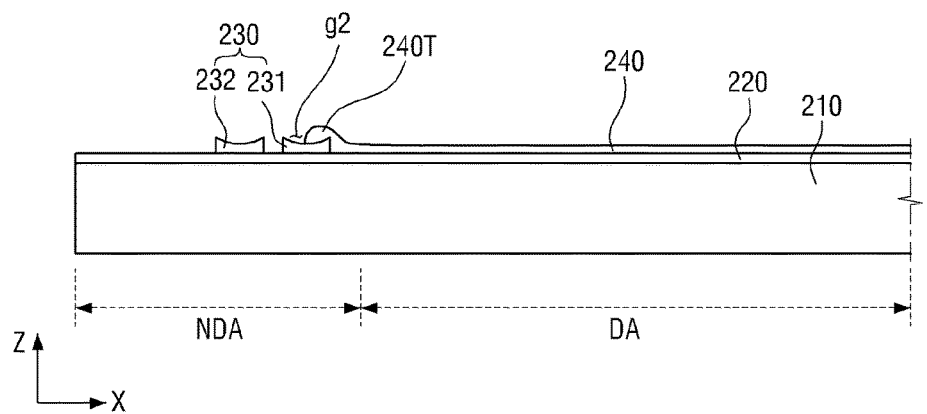

Referring now to FIG. 12, the second alignment layer 240 may be formed on the second electrode 220 disposed in the display area DA of the second substrate 210.

The second alignment layer 240 may be formed through the method similar to the method of forming the first alignment layer 190 illustrated in FIG. 9, but is not limited thereto. In an exemplary embodiment, the method of forming the second alignment layer 240 may be different from the method of forming the first alignment layer 190 with respect to discharging the stopper solution on the second electrode 220. Therefore, duplicated description thereof will be omitted.

Figure 13:
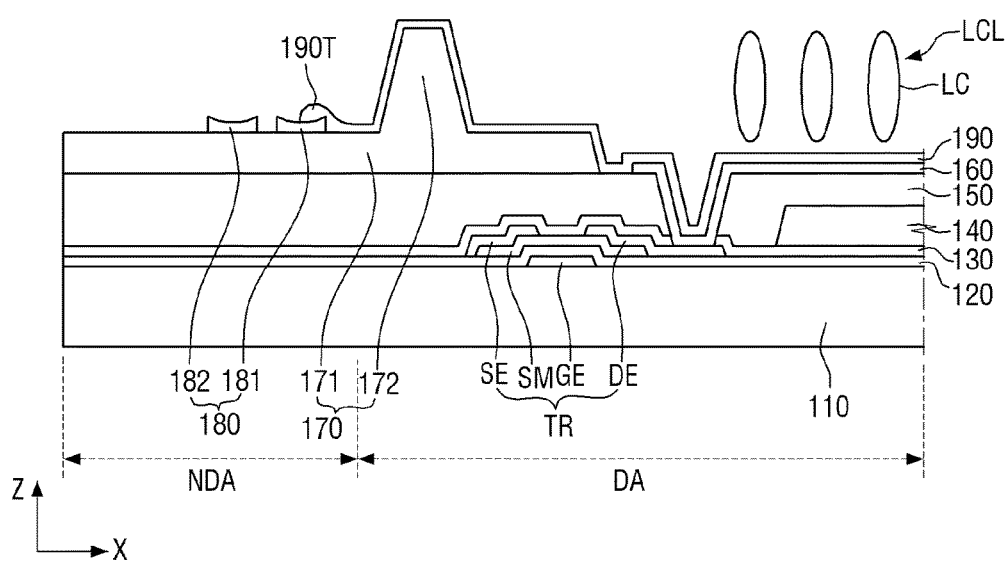

Referring to FIG. 13, liquid crystal molecules LC may be provided on the first electrode 160 of the first display panel 100 so as to form the liquid crystal layer LCL. In some exemplary embodiments, liquid crystal molecules LC may be provided on the second electrode 220 of the second display panel 200.

Figure 14:
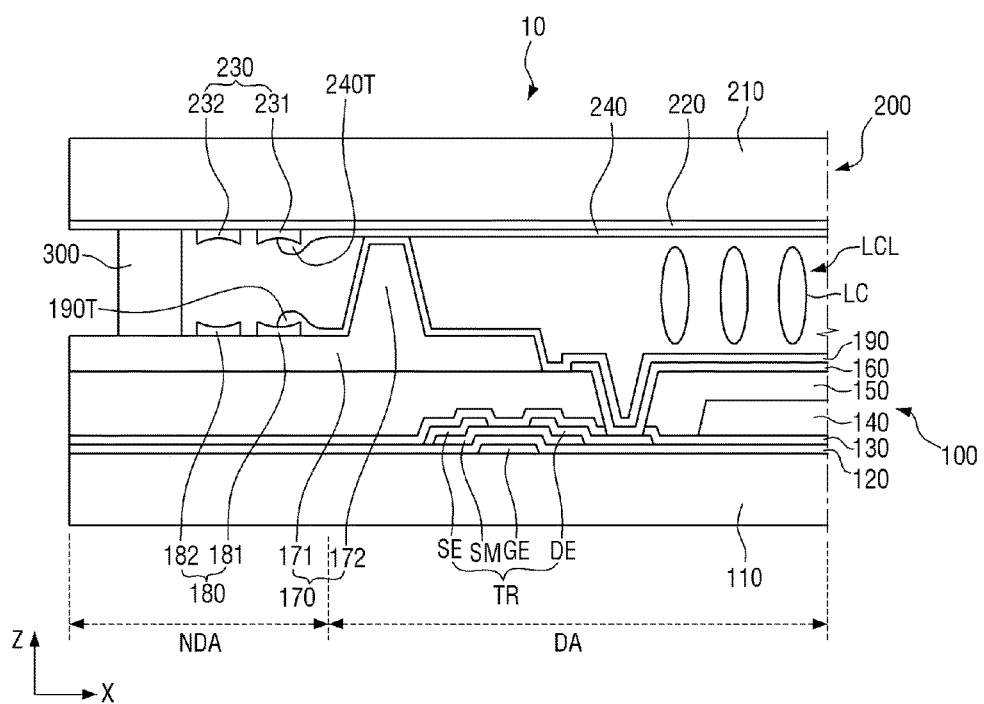

Referring to FIG. 14, the sealing member 300 may be interposed between the first display panel 100 and the second display panel 200 so as to couple the first display panel 100 and the second display panel 200 to each other and form the display device 10.

In concluding the detailed description, those skilled in the art will appreciate that many variations and modifications can be made to the exemplary embodiments without substantially departing from the principles of the invention. Therefore, the disclosed exemplary embodiments of the invention are used in a generic and descriptive sense only and not for purposes of limitation.

What is claimed is:

1. A display device comprising:
   a first substrate including a display area and a non-display area which is arranged outside the display area;
   a first dam which is disposed in the non-display area of the first substrate and which includes a first stopper having a recessed groove at a surface thereof;
   a first alignment layer which covers the display area of the first substrate, the first alignment layer defining a first portion thereof which extends to the non-display area and terminates in the recessed groove of the first stopper; and
   a column spacer disposed on the first substrate and inside the first dam, the column spacer having a hydrophilic surface,
   wherein the first alignment layer covers the hydrophilic surface of the column spacer.

2. The display device of claim 1, wherein a material of the first stopper is different from a material of the first alignment layer.

3. The display device of claim 1, wherein in a top plan view of the first substrate, the first stopper extends in extension directions thereof to enclose the display area of the first substrate and form a closed curve.

4. The display device of claim 3, wherein in the top plan view of the first substrate, edges of the first stopper are uneven along a single extension direction among the extension directions thereof.

5. The display device of claim 1, wherein a minimum thickness of the first stopper is equal to or less than a thickness of the first alignment layer in the display area of the first substrate.

6. The display device of claim 1, wherein
   the first portion of the first alignment layer contacts the surface of the first stopper in the recessed groove thereof, the first portion of the first alignment layer contacting the surface in the recessed groove of the first stopper defining a thickness greater than a thickness of the first alignment layer in the display area of the first substrate.

7. The display device of claim 1, further comprising a black column spacer interposed between the first substrate and the first dam,
   wherein the black column spacer includes:
   a light blocking portion disposed overlapped with the first dam, and
   a spacer portion disposed on the light blocking portion and not overlapped with the first dam.

8. The display device of claim 1, wherein
   the first dam further includes a second stopper which is arranged outside the first stopper and spaced apart from the first stopper, the second stopper having a recessed groove at a surface thereof, and
   the first alignment layer further defines a second portion thereof which extends to the non-display area and terminates at the surface of the second stopper.

9. The display device of claim 1, further comprising:
   a second substrate which includes a display area corresponding to the display area of the first substrate and a non-display area corresponding to the non-display area of the first substrate, the second substrate facing the first substrate with the first alignment layer interposed therebetween;
   a second dam which is disposed in the non-display area of the second substrate and which includes a third stopper having a recessed groove at a surface thereof; and
   a second alignment layer which covers the display area of the second substrate,
   wherein with the first alignment layer defining the first portion thereof which terminates in the recessed groove of the first stopper, the second alignment layer defines a first portion thereof which extends to the non-display area and terminates at the surface of the third stopper.

10. The display device of claim 9, wherein a material of the third stopper is different from a material of the second alignment layer.

11. The display device of claim 9, wherein in a top plan view of the second substrate, the third stopper extends in extension directions thereof to enclose the display area of the second substrate and form a closed curve.

12. The display device of claim 11, wherein in the top plan view of the second substrate, edges of the third stopper are uneven along a single extension direction among the extension directions thereof.

13. The display device of claim 9, wherein a minimum thickness of the third stopper is equal to or less than a thickness of the second alignment layer in the display area of the second substrate.

14. The display device of claim 9, wherein
the first portion of the second alignment layer contacts the surface of the third stopper in the recessed groove thereof, the first portion of the second alignment contacting the surface in the recessed groove of the third stopper defining a thickness greater than a thickness of the second alignment layer in the display area of the second substrate.

15. The display device of claim 9, wherein
the second dam further includes a fourth stopper which is arranged outside the third stopper and spaced apart from the third stopper, the fourth stopper having a recessed groove at a surface thereof, and
with the second alignment layer defining the first portion thereof which terminates in the recessed groove of the third stopper, the second alignment layer further defines a second portion thereof which extends to the non-display area and terminates at the surface of the fourth stopper.

16. The display device of claim 9, wherein a distance between a surface of the first stopper adjacent to the first substrate and a highest point of the first alignment layer from the first substrate is smaller than half a distance between the surface of the first stopper adjacent to the first substrate and a surface of the third stopper adjacent to the second substrate.

* * * * *